United States Patent [19]

Moore

[11] 3,854,684

[45] Dec. 17, 1974

[54] SUPPORT BRACKET

[76] Inventor: Arvel H. Moore, 1505 Chattahoochee Ave., Atlanta, Ga. 30318

[22] Filed: Jan. 4, 1973

[21] Appl. No.: 320,903

[52] U.S. Cl. ............... 248/68 R, 174/157, 248/59, 248/67.5, 248/70, 248/73, 248/225
[51] Int. Cl. ............................................. F16l 3/00
[58] Field of Search .......... 248/68 R, 70, 58, 59, 73, 248/225, 68 CB, 67.5; 138/107; 174/156, 174/157; 211/182

[56] References Cited
UNITED STATES PATENTS

| | | | |
|---|---|---|---|
| 411,801 | 10/1889 | Fletcher | 174/157 |
| 799,092 | 9/1905 | Rosenfeld | 248/68 R |
| 1,540,641 | 6/1925 | Lockhart | 211/182 X |
| 2,345,650 | 4/1944 | Attwood | 211/182 X |
| 2,396,836 | 3/1946 | Ellinwood | 174/157 X |
| 2,846,169 | 8/1958 | Sullivan | 248/62 |
| 2,880,949 | 4/1959 | Fuss | 248/70 |
| 3,226,069 | 12/1965 | Clarke | 248/68 R X |
| 3,370,815 | 2/1968 | Opperthauser | 248/68 R X |
| 3,513,606 | 5/1970 | Jones | 211/182 X |
| 3,582,029 | 6/1971 | Moesta | 248/68 R |

FOREIGN PATENTS OR APPLICATIONS

| | | | |
|---|---|---|---|
| 560,740 | 4/1944 | Great Britain | 174/157 |
| 335,221 | 9/1930 | Great Britain | 174/157 |
| 1,150,422 | 6/1963 | Germany | 248/68 R |

*Primary Examiner*—Roy D. Frazier
*Assistant Examiner*—Rodney H. Bonck
*Attorney, Agent, or Firm*—Newton, Hopkins & Ormsby

[57] ABSTRACT

A support bracket for use in supporting, spacing and aligning suspended elongated elements such as pipes in relationship to a fixed structural support means. The support bracket includes a base support means adapted to receive a clamping means which will permit selectively clamping of a pipe or like element incrementally on a selected support surface on the base support means. The support bracket includes means for attaching the bracket assembly to a self-supported structure.

4 Claims, 15 Drawing Figures

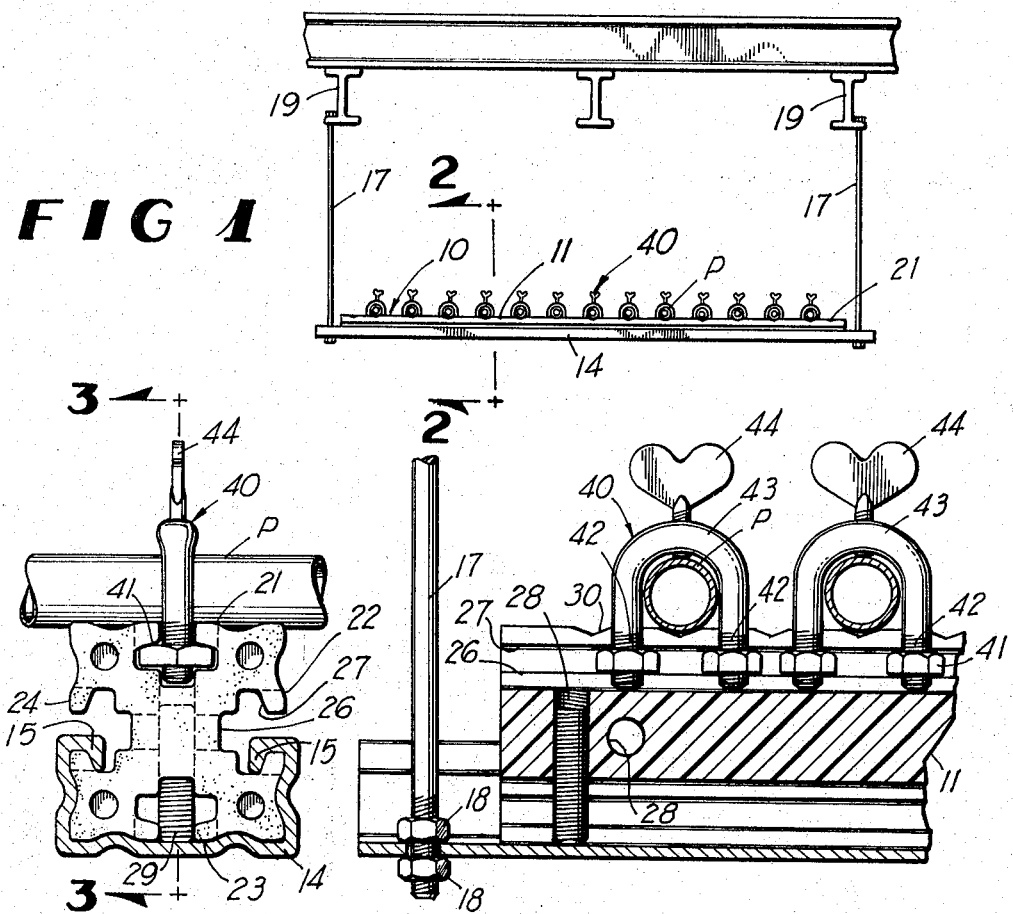
FIG 1
FIG 2
FIG 3
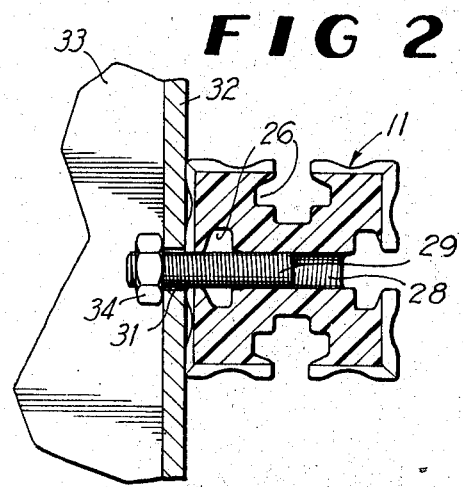
FIG 5
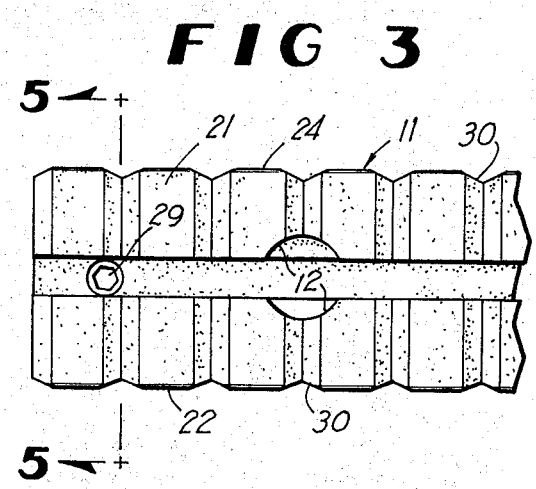
FIG 4

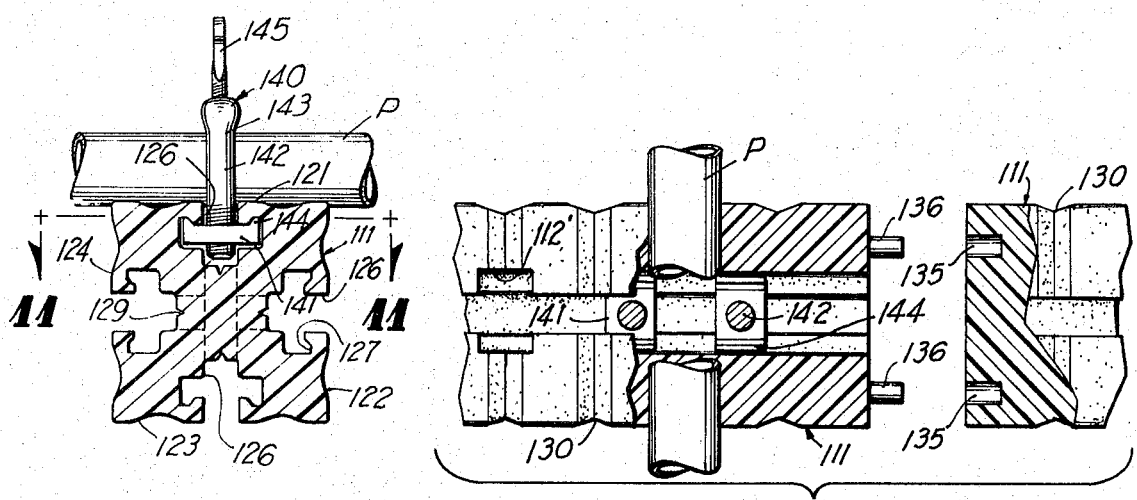
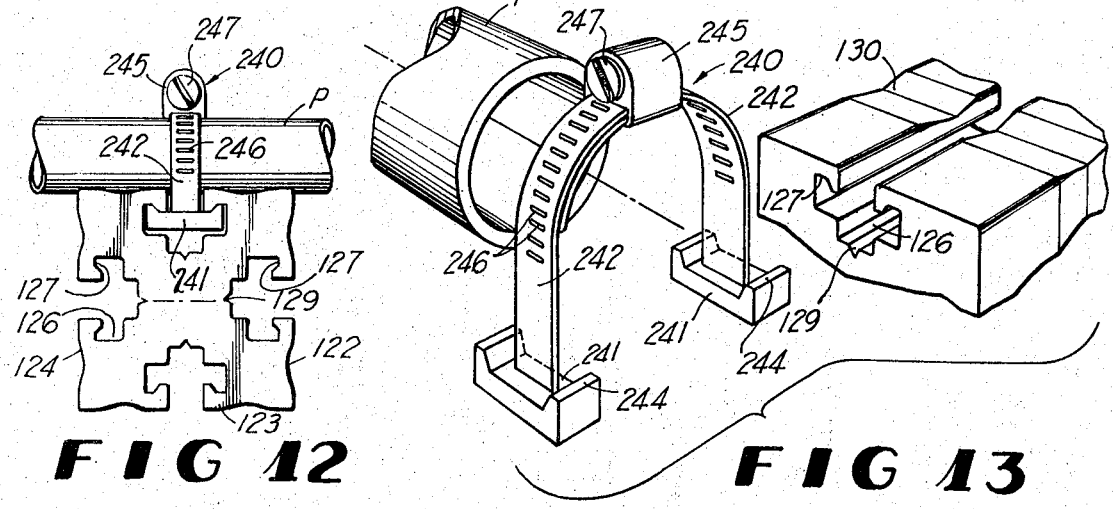
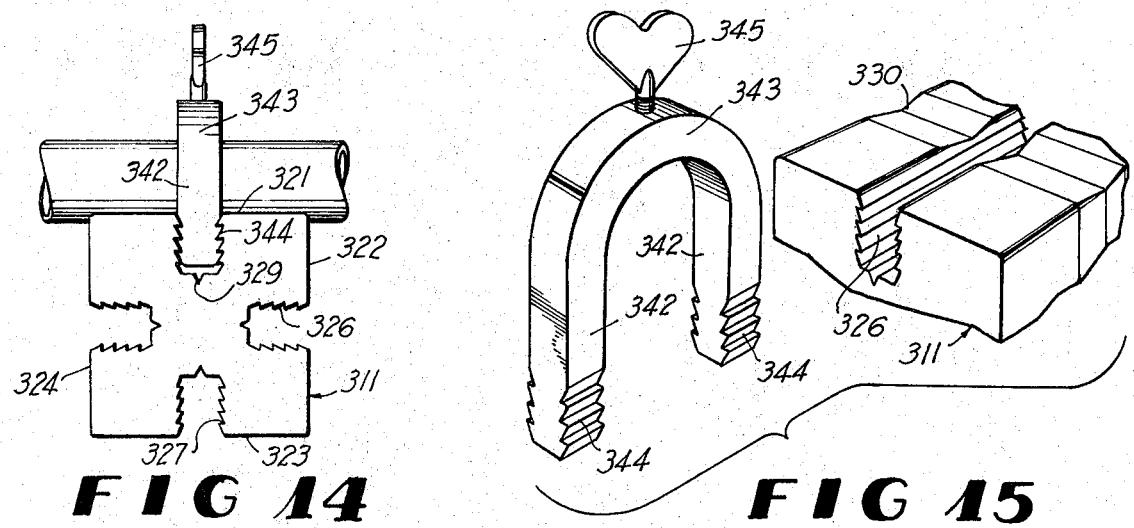

SUPPORT BRACKET

BACKGROUND OF THE INVENTION

This invention relates to a mounting means for mounting extended elongated elements, such as pipes, in position relative to a self-supporting structure in a building construction and is particularly concerned with a bracket for supporting in a spaced and aligned relationship a plurality of pipes or the like in a common and parallel plane with a clamping means adapted to be secured in predetermined set positions relative to a base support means for supporting said elements.

A building construction usually includes a series of truss members, I-beams or other like fixed structural support members suited for receiving a support strap or other supporting means to provide a fixed support for the support bracket. It is a common practice in building construction to use some type of support mechanism to attach pipes, conduits or other like elongated elements; however, in the past, most construction workers have improvised miscellaneous hardware to attach and suspend elongated elements such as pipes, conduit and the like to a self-supporting structure. Of the support brackets available for this purpose, they were normally difficult to use, inefficient insofar as ease of installation of the pipes and did not provide for a means of selectively securing the pipes to be supported in a predetermined position along their supporting surface and did not permit adjustment during or after installation without great difficulty.

SUMMARY OF THE INVENTION

The above disadvantages of the prior art suspended pipe support mechanisms have been overcome by the present invention which basically includes base support means used in combination with a securing means and element receiving recesses formed in the base support means which coincide with securing means for supporting a suspended elongated element such as a pipe, and said base support means includes a number of angularly disposed supporting surfaces suited to receive a clamping means in order to permit selection of a number of supporting surfaces to be used in relationship to a given size pipe.

It is therefore a primary objective of the present invention to provide a versatile support bracket for use in attaching a given size pipe to correspond with a selected complementary element receiving recess associated with a given angularly disposed side of which there are a plurality provided on a support bracket in communion with a securing means for attaching said pipe in a predetermined set relationship in selected angularly disposed clamping surfaces on the base support means.

A further object of the present invention is to provide a pipe support bracket having an easily assembled clamping means complementary in shape to the associated pipes.

An additional object of the present invention is to provide a pipe support bracket simple in construction, easy to use, economical to manufacture and reliable in performance.

Still other objects and advantages of the details of construction will become apparent upon reading the accompanying description of the illustrative embodiment with reference to the attached drawings wherein like numerals have been used to refer to like parts throughout the several figures and wherein:

BRIEF DESCRIPTION OF THE DRAWINGS

FIG. 1 is a cross-sectional end elevational view of a pipe support bracket employed in its environment and embodying some of the principles of the present invention;

FIG. 2 is a side elevational cross-section taken along line 2—2 in FIG. 1;

FIG. 3 is an end elevational cross-section taken along line 3—3 in FIG. 2;

FIG. 4 is a top plan view of a base support means as shown in FIG. 3;

FIG. 5 is a side elevational cross-section of a base support bracket taken along line 5—5 in FIG. 4;

FIG. 10 is an end elevational view of a support bracket and securing means secured thereto;

FIG. 11 is a top plan view taken along line 11—11 in FIG. 10 with a portion thereof in cross-section.

FIG. 12 is an end elevational view of the base support bracket employing another securing means;

FIG. 13 is an exploded perspective view showing a portion of the base support bracket and a securing means as shown in FIG. 12;

FIG. 14 is still another side elevation of an alternate support bracket used in concert with a complementary alternate securing means; and FIG. 15 is an exploded perspective view of a portion of the support bracket and securing means as shown in FIG. 14.

DESCRIPTION OF THE ILLUSTRATIVE EMBODIMENTS

Figure 6:
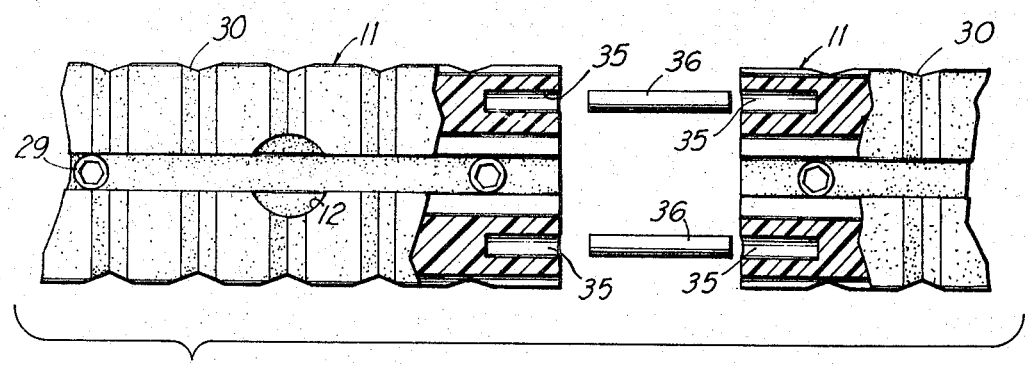
FIG. 6 is a top plan elevation of a base support bracket with a portion thereof in cross-section.

Referring now to the drawings, the support bracket embodying some of the principles of the present invention is shown in FIG. 1 and is generally represented by the reference numeral 10. The bracket 10 consists of an elongated channel member of electrically non-conducting material 11 and is utilized for attaching an elongated element such as a pipe P or a plurality of pipes with a securing means 40 in communion with V grooves 30 which provide element receiving recessess. These recessess are incrementally spaced perpendicular to the longitudinal axis of the channel 11.

In this particular embodiment which may more clearly be seen in FIGS. 2 and 3, which are detailed section views of FIG. 1, it might be desirable to reinforce the channel 11 with an existing metal channel member 14 which is generally U-shaped and has depending flanges 15 which coincide with shoulder members 27 on the channel member 11, said shoulder members thereby slidably engage the channel 11. The outer support channel 14 now encompasses a portion of the channel 11 and after the channels have been adjusted relative to their desired positions, relative to each other, the channel member 11 is secured by fasteners 29. The channel 11 is provided with internally threaded apertures 28 which are bi-directionally perpendicular to each other and equi-distantly spaced in pairs perpendicular to the longitudinal place of the axis of the channel 11. These internally threaded apertures 28 receive an externally threaded fastener 29 which is provided at one end with an inset hexagonal aperture, this fastener is commonly known as an allen head stud. These studs 29 are threaded through the apertures 28 into frictional engagement with the inner surface of the outer channel member 14 and thereby forces the channel upward to bias shoulder members 27 into engagement with the depending flanges 15 on the channel 14.

As shown in FIG. 1 and in more detail in FIG. 3, a portion of the channel member 14 is left to overlap the ends of the support channel member 11 and thereby presents a surface for an aperture 16 to receive a threaded hanger rod 17 with nuts 18 to sandwich a portion of channel 14 into position on the rod 17. The rods then are fixed to a fixed structural support 19, and to those skilled in the art, this is known as a trapeze type arrangement for suspending pipes in a building construction. It will be obvious that while hanger rods have been shown, a simpler but less rigid means for securing the bracket assembly could be accomplished by simply using hanger wires, bent and twisted to accomplish the same effect.

As more clearly seen in FIG. 2, the channel member 11 has angularly disposed sides 21, 22, 23 and 24. Each side is fitted with V-grooves 30 which are spaced incrementally along a given surface perpendicular to the longitudinal axis of the channel. These grooves present element receiving recesses to receive an elongated element such as a pipe P. By virtue of the incremental spacing of these grooves 30, which may be for instance 1 inch apart from dead center to dead center, it provides a measurement guide to an installer whereby he can cut a length of channel to a specific length without the necessity of measuring tools.

Running parallel and down the center of the base support channel are receiving channels 26 which have a width and depth sufficient to receive the threaded leg portions 42 of a securing means generally indicated by the reference numeral 40. Said receiving channels 26 act in concert with the clamping means which is generally U-shaped with leg portions 42 terminating in threads at their lower end to receive nuts 41 which are provided to act as retaining shoulders for the securing means when inserted into the receiving channel 26. The receiving channel 26 receives the nut 41 and a portion of the threaded leg portion 42. The nut 41 is biased up, within the receiving channel 26, into engagement with receiving shoulders 27 of the channel 26.

The said biasing of the nut 41 into engagement with the receiving shoulders 27 is enacted by means of a butterfly type bolt 44 located at the apex base portion of the securing means. This apex portion 43 of the securing means 40 is curved and encompasses a portion of the pipe P. When the clamping means 44 is threaded into abutment with the pipe, it thereby depresses the pipe into engagement with grooves 30 and simultaneously lifts nuts 41 into engagement with the receiving shoulders 27. It should be noted that the width of the receiving channel 26 is such that it will not permit the nut 41 to rotate due to the dimension of the channel in relation to the nut.

As shown in FIG. 4, the size of the V-groove associated with angularly disposed surface 21 is of a slightly smaller size than the grooves on the surface 22 which, in turn, are of a different dimension from those grooves on surface 23 and thus different from those grooves on surface 24. The reason for the different size V-grooves 30 is to make the channel member 11 universal, in that it will be capable of receiving a plurality of size ranges of pipe to correspond with a compatible recess.

Shown also in the receiving channel 26 is an annular cutout 12 which would allow the nut 41 on the securing means 40 to be inserted by dropping one bolted leg vertically down into the channel and sliding the securing means with one bolted leg in the channel until the other bolt on the complementary leg coincides with the annular cutout 12 and is dropped into place. At this point the securing means can then be slid along the channel to its desired location for clamping. The annular cutouts thereby allow vertical access in a number of places along the channel without having to rely upon entrance from one or the other open ends on the channel, which may not be accessible without greater difficulty, if a securing means and pipe have already been clamped thereto.

In FIG. 6, there is illustrated a method in which a section of channel member 11 can be joined with another section for forming a continuous elongated channel. The ends of channel 11 are provided with apertures 35 which coincide with each other to receive a dowel pin 36 whereupon a suitable adhesive material can be applied to the dowel pins and or abutting end surfaces of the channel members 11 and thereby form an abutting bonded joint therebetween.

Briefly referring back to FIG. 5, it will be seen that the receiving channels 26 extending into the channel 11 from each of the said angularly disposed sides 21, 22, 23 and 24 form a reduced cross-sectional area within support channel 11, primarily between one receiving channel and its corresponding juxtaposed receiving channel producing a break-off plane within, and rendering the channel easily divisible with a saw or other suitable cutting tool.

Figure 7:
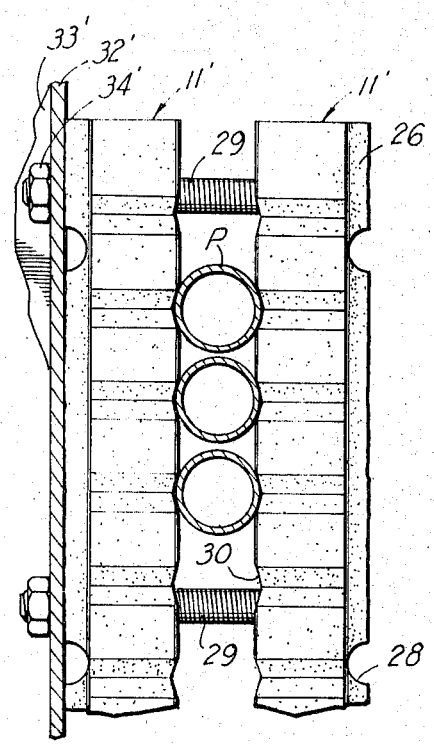
FIG. 7 is an end elevation of a portion of two base support brackets in a juxtaposed relationship to secure pipes therebetween their complementary supporting surfaces.

Referring now to FIG. 7, it will be seen that two support channels 11 have been divided in this fashion forming half channels 11' and their element receiving recesses or V-grooves 30 have been placed in juxtaposition relative to each other to sandwich therebetween the pipes P. The channels 11' themselves thereby secure the pipes threading the fastening stud 29 from one threaded aperture 28 in one-half of one channel member 11' into corresponding threaded aperture 28 into the other complementary half of another channel member 11'. A threaded end portion of the stud projects from the channel member allowing it to be fixed to a plate 32' on a fixed structural support 33' by threading nut 34' onto the end of the stud 29 sandwiching therebetween plate 32'.

Figure 8:
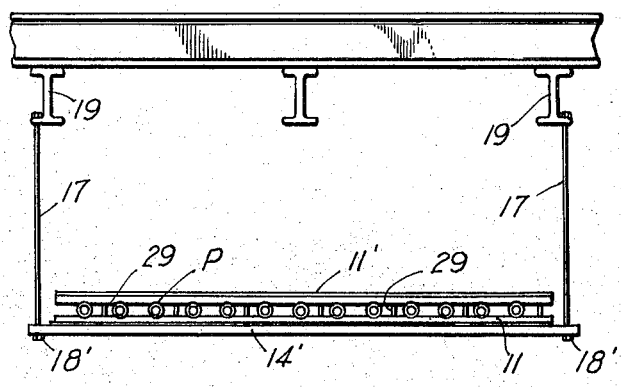
FIG. 8 is a cross-sectional elevation of a further embodiment similar to FIG. 1 of a support bracket employed in its environment, and embodying still further principles of the present invention.
Figure 9:
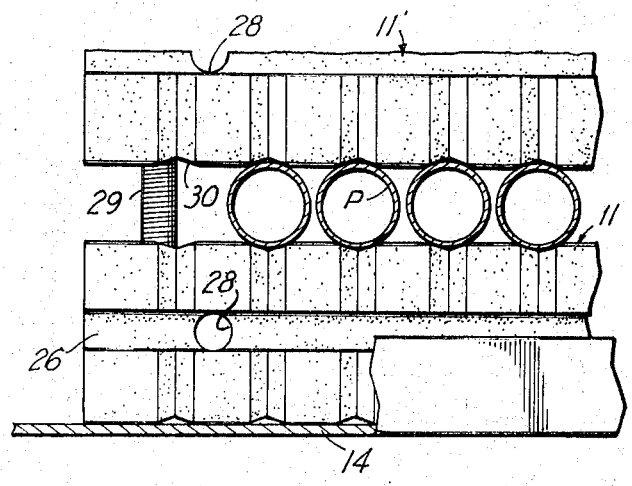
FIG. 9 is a detailed end elevation with a portion thereof in cross-section of the support apparatus as shown in FIG. 8.

It will now be seen in FIG. 8, that pipes P have been suspended in the same manner as shown in FIG. 1 in a trapeze type arrangement. In this embodiment, the individual securing means 40, shown in FIG. 1, is eliminated and the half channel member 11' is threaded through studs 29 selectively along the channel to engage the lower full support channel 11. The upper complementary half channel 11' and lower full channel 11 sandwich and clamp therebetween the pipes P. The principles of the embodiment are more clearly seen in a detailed illustration shown in FIG. 9.

FIG. 10 is an alternate embodiment of the support channel 111 having angularly disposed sides 121, 122, 123 and 124, with receiving channels 126 running centrally and in a parallel plane with the axis of the channel associated with each angularly disposed side. A securing means 140 is generally U-shaped with an arcuate base portion 143 to encompass a portion of the pipe, terminating tangentially into parallel and depending straight leg portions 142 which are threaded at their ends to receive a retaining member 141 which is complementary in shape to lockingly engage the receiving shoulders 127 of the receiving channel 126. Retaining means 141 is thereby internally to be threaded to the threaded ends of the securing member 140. Said securing member 141 has a pair of upstanding flanges 144 to engage a recessed portion 127' in receiving channel 126. The receiving channel is provided also with a recessed groove or slot 129 which is formed with and runs centrally along the bottom of the receiving channel 126. This groove 129 is provided to further reduce the cross-sectional area of the channel 111 from receiving channel 126 to its juxtaposed receiving channel on the opposite angularly disposed side. The slot 129 is provided also as a guide for a cutting tool to allow easy separation of the channel into divisible parts.

FIG. 11, which is a top plan view of a portion of FIG. 10, shows a rectangular cutout 112 in the shoulder 127 of the receiving channel 126. This cutout 112 is complementary in shape and slightly larger than the retaining means 141. The cutouts are provided in spaced plurality along each receiving channel 126 to allow vertical access of member 141 on securing element 140 so as to allow a pipe P to be inserted in a number of places along the channel without having to rely upon insertion from one or the other open ends of the channel.

Shown also in FIG. 11 is another alternate means for fixing a length of one support channel member 111 to the ends of another channel member. Each channel 111 will have at one end, a fixed stud member or dowel pin 136 and at its opposite end recessed cylindrical apertures 135 complementary in size and location to receive said dowel pins 136 molded into the opposite end. When fixing channel 111 to an additional length of channel, these apertures and complementary dowel pins act as aligning means; and, if suitable adhesive is applied to the abutting ends of the channels and their associated dowel pins, a structurally sound joint is formed and therein bonds the members.

In FIG. 12 is shown the channel member 111 of FIG. 10 with an alternate securing means to communicate and lockingly engage receiving channel 126. More clearly shown in the exploded perspective view of FIG. 13, the alternate securing means 240 is generally a worm gear drive type securing and clamping means. Said clamp consists of a pair of bands 242 which at their upper base end are passingly aligned and drivingly positioned relative to each other by virtue of housing 245, inside of which there is a worm gear 247 provided with a screw head to turn the worm. The worm engages notches or slots 246 on the bands 242 to tighten or loosen retaining members 241 located on the terminal ends of the bands. Said members 241 are provided with upstanding flanged shoulders 244 to thereby lockingly engage recessed receiving shoulders 127' within the receiving channel 126 on the support channel 111. By turning the screw head on the worm 247 to bring the bands toward each other, it will thereby reduce the cross-sectional area of the securing means and bring a peripheral surface of pipe P into locking engagement with V-groove 130 on the support channel, while at the same time urge flanges 244 into engagement with complementary shoulders 127' on the receiving channel 126 of the channel 111.

As shown in FIGS. 14 and 15, a still further embodiment of the support channel is designated generally by the reference numeral 311. Said channel has angularly disposed sides 321, 322, 323 and 324. Each angularly disposed side is provided with a receiving channel 326. Said receiving channel 326 is provided with ratchet type teeth 327 which provide shoulders to engage complementary ratchet teeth 344 which provide retaining means on the securing element 340. Securing means 340 is substantially U-shaped with an arcuate base member 343 terminating in straight legs 324 which are provided with ratchet teeth 344. At the apex of the base member 343 there is provided a butterfly screw 345 to further clamp the pipe into engagement with recess 330, once the securing means 340 has been forced into engagement with the receiving channel 326. At the bottom of the receiving channel 326 is provided a groove or slot 329 that runs longitudinally and parallel down the center of the receiving channel 326, which serves to further reduce the cross-sectional area from one channel 326 to its opposite corresponding channel thus rendering it more easily divisible and defining a cutting guide for a suitable cutting tool.

It has now become apparent that the above described illustrative embodiments of a pipe supporting bracket are capable of obtaining the above stated objects and advantages. It is obvious that those skilled in the art may make modifications in the details of construction without departing from the spirit of the invention which is to be limited only by the scope of the appended claims.

What is claimed:

1. Apparatus for use in supporting, spacing and aligning at least one elongated element in a set position comprising:
   a. a base support means consisting of a support member having a recessed continuous receiving channel with a pair of receiving shoulders, said support means including a support surface having a plurality of element receiving recesses transverse to said channel; and
   b. securing means including a plurality of retaining shoulders complementary to said receiving channel and said receiving shoulders operable for permitting adjustment of said securing means along said channel so that said securing means can be selectively aligned relative to one of said recesses, and wherein said securing means includes means for clamping at least one of said elements in a set position relative to one of said recesses on said base support means;
   c. said base support means including a plurality of angularly disposed supporting surfaces with each surface including said receiving channel with said receiving shoulders for receiving said securing means;
   d. said apparatus including a substantially U-shaped outer supporting channel comprising side walls and flanges depending from the terminal portion of said walls; said angularly disposed surfaces being of a size to permit said depending flanges to be received within said receiving shoulders so as to lockingly and sildably engage said outer supporting channel.

2. Apparatus as defined in claim 1 further characterized in that said securing means retaining shoulders are adjustable along said leg members.

3. Apparatus for supporting a cluster of tubular elements, such as pipes, in parallel relation, comprising the combination of:

an elongate base member constructed of electrically insulating material, said base member being of generally rectangular cross section defining perpendicular adjacent side surfaces with each side surface being provided with a centrally located and longitudinally extending T-slot throughout the length thereof, each side surface having a series of longitudinally spaced and transversely extending grooves extending thereacross, a pair of orthogonally related, internally threaded bores adjacent each end of said base member each extending from the bottom of one T-slot to the bottom of the T-slot opposite thereto;

a rigid, metallic support;

one side surface of said base member being juxtaposed with relation to said support, and securing means received in a parallel pair of said internally threaded bores for rigidly affixing said base member to said support to expose that side surface of said base member opposite said one side surface thereto to receive said cluster of tubular elements in selected ones of said grooves; and a clamping assembly associated with each of said selected grooves, each clamping assembly including a pair of leg portions straddling an associated groove and projecting into the T-slot of said opposite side surface and an abutment member on each such leg portion engaged and held captive within such T-slot.

4. Apparatus according to claim 3 wherein said support is a channel member having a web parallel to said one side surface and opposite side edge flange portions extending along the adjacent side surfaces to and into the T-slots associated therewith.

* * * * *